Aug. 15, 1939.  D. F. IRBY  2,169,646
BRAKE SYSTEM
Filed Jan. 27, 1938  3 Sheets-Sheet 1

Inventor
David Fowler Irby

By Clarence A. O'Brien
Hyman Berman
Attorneys

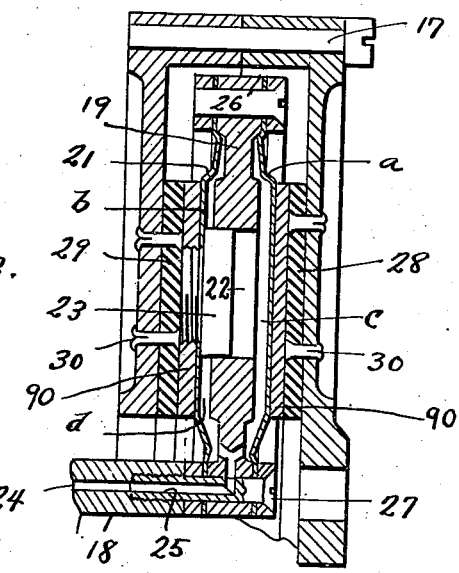
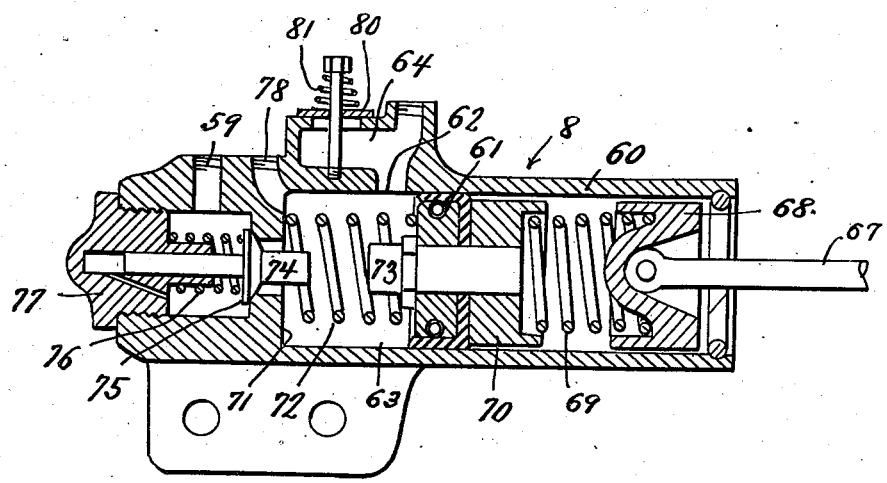

Aug. 15, 1939.　　　D. F. IRBY　　　2,169,646
BRAKE SYSTEM
Filed Jan. 27, 1938　　　3 Sheets—Sheet 3
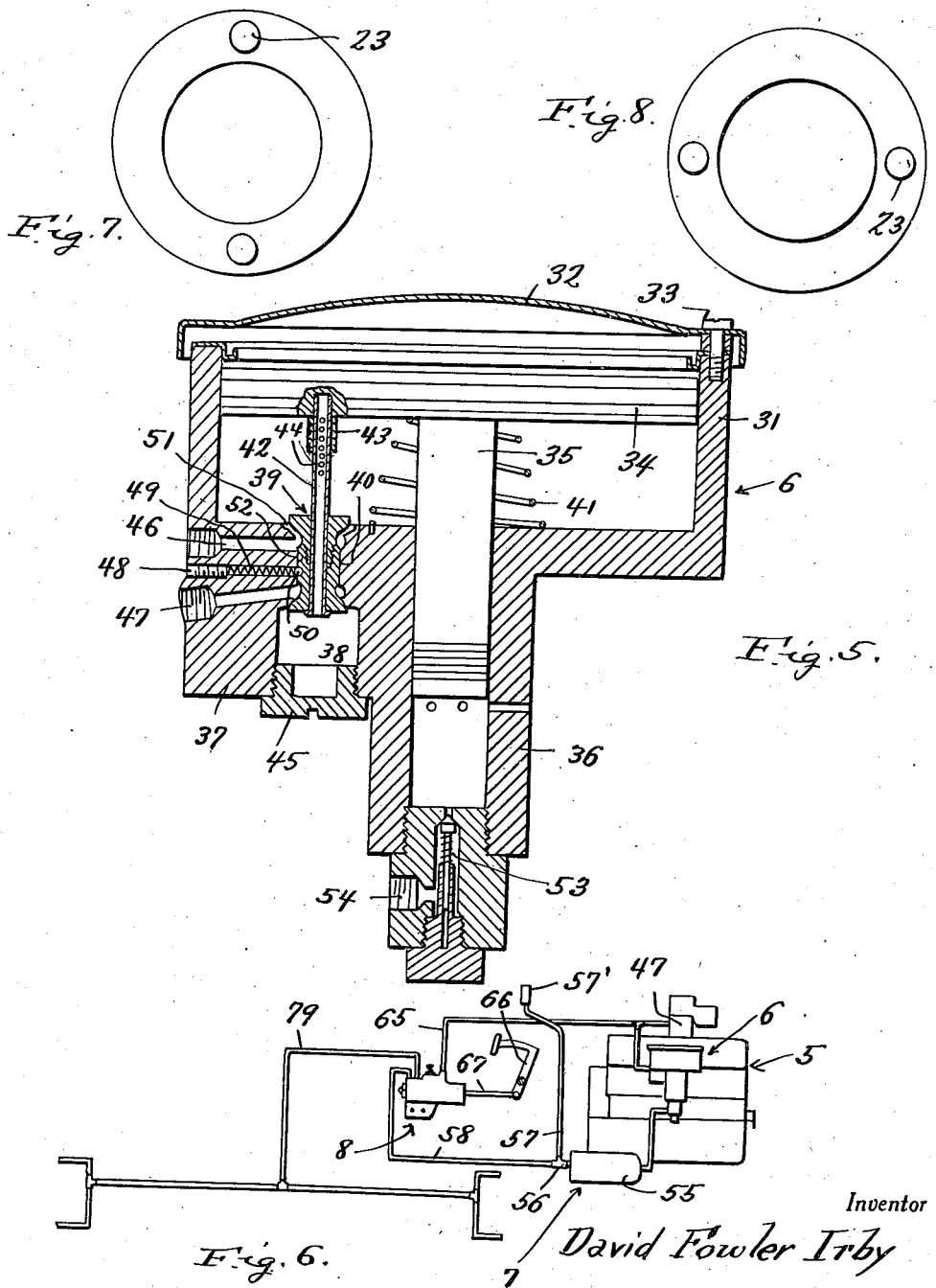
Inventor
David Fowler Irby
By Clarence A. O'Brien
Hyman Berman
Attorneys Patented Aug. 15, 1939

2,169,646

UNITED STATES PATENT OFFICE 2,169,646

BRAKE SYSTEM

David Fowler Irby, Gretna, La., assignor of one-fourth to Joseph Calzada and one-fourth to Frederick J. Fabre, both of Gretna, La.

Application January 27, 1938, Serial No. 187,289

2 Claims. (Cl. 188—152)

This invention appertains to new and useful improvements in braking systems for vehicles and more particularly to a system of this character for automobiles.

The principal object of the present invention is to provide a braking system which can be used in conjunction with the usual internal combustion engine of the automobile, wherein the usual suction effect of the internal combustion engine will produce the necessary power for operating the brakes.

Another object of the invention is to provide a braking apparatus for vehicles wherein the suction effect of the internal combustion engine will build up air pressure for operating the usual brakes of the automobile.

Another important object of the invention is to provide a braking system for land vehicles of the motor driven type wherein the motor is employed for producing air pressure for operating the brakes in a practical and highly efficient manner.

These and various other important objects and advantages of the invention will become apparent to the reader of the following specification.

In the drawings:

Figure 3 is an enlarged detailed sectional view of the wheel brake structure.

Figure 4 is a longitudinal sectional view through the control valve.

Figure 5 is a vertical sectional view through the pump means.

Figure 6 is a diagrammatic view disclosing the various connections between the pump, valve and wheels.

Figure 7 and Figure 8 represent elevational views of the braking elements.

Figure 1:
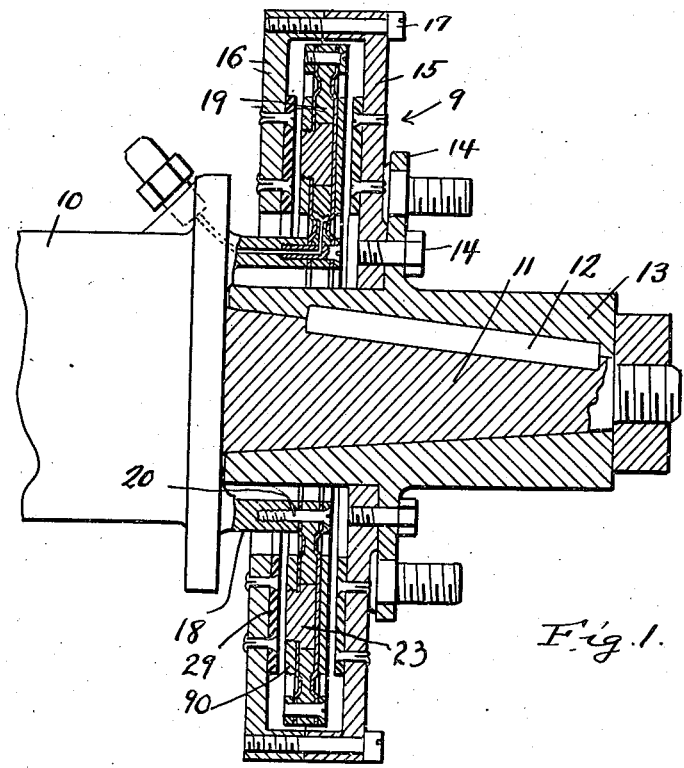
Figure 1 represents a fragmentary detailed sectional view through the wheel brakes.
Figure 2:
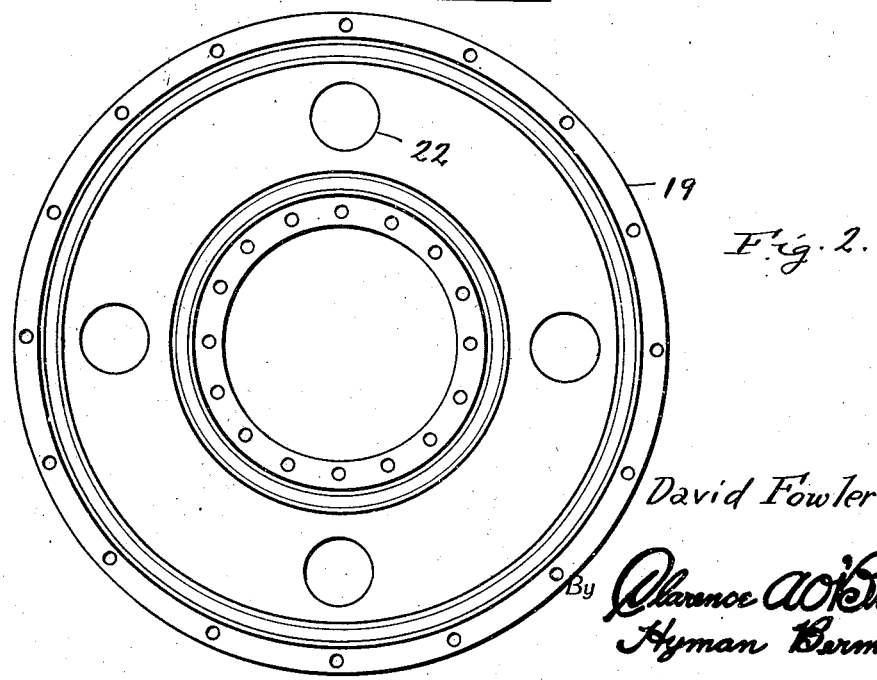
Figure 2 represents an elevational view of one section of the brake housing, showing the expansible annulus.

Referring to the drawings wherein like numerals designate like parts, it can be seen in Figure 6, that numeral 5 generally refers to the internal combustion engine. Numeral 6 generally refers to the pump of the braking system which is connected with the pressure tank generally referred to by numeral 7. Numeral 8 generally refers to the control valve from which connections are made to the wheel assemblies generally referred to by numeral 9 (see Figures 1 and 3).

As shown in Figure 1, numeral 10 denotes the usual axle housing from which extends the usual tapered axle end 11 keyed as at 12 to the hub 13. The hub 13 is provided with the annular flange 14 bolted as at 14' to the section 15 of the housing of the brake.

The section 16 of the housing is bolted as at 17 to the section 15 and in spaced relation with respect thereto.

The collar 18 extends from the housing 10 and is provided with the annulus 19 extending vertically therefrom. This annulus 19 is bolted as at 20 to the collar 18 and to opposite sides of this annulus 19 is secured a pair of diaphramic elements 21. These elements are indicated by the letters a and b and the annulus is formed with a plurality of openings 22, in each of which is arranged the head of an anchor bolt 23. These bolts have their threaded shanks passing through the elements a and b into threaded holes in the friction plates 90 so that these plates are clamped to the outer faces of the elements a and b.

The inner ends of these diaphragms a—b are secured suitably to the collar 18 (see Figure 3).

Through the collar 18 extends a duct or ducts 24 which open through the tubes 25 into the spaces c—d, between the diaphragms a—b and the annulus 19. As shown in Figure 3, the diaphragms are secured to the annulus 19 by bolts 26 at their outer edges and at their inner edges to the collar 18 as at 27.

The sections 15—16 of the brake drum are provided with annular linings 28—29 suitably riveted in place as at 30.

Thus it will be seen that when pressure is introduced into the spaces c and d, the diaphragms a and b are forced outwardly so that the annular friction plates 90 are pressed against the linings 28 and 29 to exert a braking action on the wheel. Due to the small area of the air chambers c and d the action is fast and positive. Upon the release of the air pressure the spring action of the diaphragms makes them resume their normal positions, as shown in Fig. 1. All torque is removed from the diaphragms by the anchor bolts 23, the torque being transmitted to the assembly plates through these anchor bolts.

The pump mechanism generally referred to by numeral 6 consists of the shell 31 provided with the removable cap 32 bolted in place as at 33. The bolts pass through spacers so that the cap 32 is spaced from the top of the shell to provide air vent means on the upward movement of the piston. Operative within the shell 31 is the piston 34 provided with suitable packing means and having the plunger 35 operating in the cylinder 36 which depends from the shell 31. A formation 37 at one side of the cylinder 36 has the pocket 38 therein into which the valve element generally referred to by numeral 39 is movable. This valve element 39 is slidable in the bore 40 which communicates the pocket 38 with the interior of the cylinder.

For urging the piston 34 upwardly, the spring 41 is interposed between the bottom of the shell 31 and the piston 34, and as is shown in Figure 5, a tube 42 extends downwardly from the piston 34 and operates through the body of the valve element 39. This tube 42 is provided with the stop collar 43 and has perforations 44 therein. The lower end of the pocket 38 is threaded to receive the plug 45 as is shown in Figure 5.

Numeral 46 represents the suction duct which is connected with the intake manifold 47' of the internal combustion engine 5, while numeral 47 represents the duct through the body 37 to the atmosphere.

An adjustable threaded element 48 is feedable against the spring 49 for adjusting the tension against the ball 50 for holding the valve element 39 either in the lowermost position or in the position shown in Figure 5.

As shown in Figure 5, when suction is exerted on the piston 34, the piston is forced downwardly and as the collar 43 strikes the valve element 39, the valve element will be moved downwardly so as to close the port 51 in which position, the ball 50 will be engaging in the recess 52. This downward movement of the valve element will place the duct 47 in communication with the pocket 38 so that air entering the pocket through the duct 47 will pass through the tube 42 and the perforations therein into the lower part of the shell under the piston 34 to permit the spring 41 to return the piston to its upper position and as the piston nears its upper position the bent lower end of the tube 42 will engage the valve element 39 and raise the same to the position shown in Fig. 5 so that the part of the shell under the piston will be again in communication with the suction of the engine so that the piston will move downwardly again. During the downward movement of the plunger 35, air in the cylinder 36 will be forced by the valve 53 and the outlet 54 to the pressure tank 55. The pressure tank 55 has the outlet 56 from which leads a branch 57 to the gauge 57' and the pipe line 58 to the port 59 of the valve generally referred to by numeral 8.

The valve structure 8 consists of the shell 60 having the packed piston 61 therein operative across the port 62. The port 62 opens the chamber 63 into the pocket 64 which has the connection 65 to the inlet side of the internal combustion engine 5 so as to draw out all air in the system when it is desired that the brakes be released.

As is shown in Figure 6, numeral 66 denotes the usual foot brake pedal which has the rod connection 67 to the follower 68 operative within the shell 60 and against the spring 69, which spring impinges against the block 70 which, in turn bears against the packed plunger 61.

Interposed between the wall 71 and the plunger 61 is the coiled compressible spring 72 through which the boss 73 is operative against the valve stem 74 of the valve 75 which is operative against the spring 76 adjustable by the plug 77 in the adjacent end of the shell 60.

Obviously when the plunger 61 is forced toward the left in Figure 4, the port 62 will be closed and the boss 73 will open the valve 75 so that pressure will be exerted through the inlet 59 from the pressure tank 55 to the chamber 63 and through the outlet 78 and pipe 79 to the brakes 9. Numeral 80 denotes the release valve which is normally maintained closed by the spring means 81.

Thus when it is desired to apply the brake, the pedal 66 is pressed upon which through the rod 67 moves the member 68 forwardly against the action of the spring 69 and causes the spring to press the members 70 and 61 forwardly so that the member 61 closes the port 62, thus closing communication between the chamber 63 and the suction means of the engine and upon further forward movement the part 73 will strike the part 74 of the valve 75 so as to move the valve 75 off its seat. This will permit the pressure from tank 55 through port 59 to pass the valve 75 and thus flow into the chamber 63 and from this chamber the compressed air will pass through the port 78 and flow to the brakes through the pipes 79. When the pressure on the member 61 from the compressed air equals the pressure applied to the brake pedal, the piston means 70 and 61 will recede, compressing spring 69 which will permit spring 76 to close valve 75. Thus no more of the compressed air can flow into the brakes. Then when the pedal is released the parts return to the position shown in Fig. 4 which permits the pressure in chamber 63 to enter chamber 64 and escape through the valve 80 and vacuum from the engine through pipe 65 will exhaust the entire braking system. The spring 72 holds the piston parts 70 and 61 in released position when the vacuum is applied to the exhaust system. This vacuum exhaust of the system assures constant running clearance in the wheel units.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. Brake mechanism of the class described comprising a rotary part, a drum connected with said rotary part, a stationary part, an annulus connected with the stationary part and located in the drum, said annulus having transverse openings therein, annular diaphragms at the sides of the annulus and having their inner and outer edges connected with the annulus, friction plates contacting the outer faces of the diaphragm, anchor bolts having their heads slidably arranged in the openings of the annulus and the shanks passing through threaded holes in the friction plates and through holes in the diaphragms for clamping the friction plates to said diaphragms, friction means carried by the inner faces of the drum and engaged by the friction plates of the diaphragms when the diaphragms are expanded, and means for forcing fluid between the diaphragms and the annulus to expand said diaphragms.

2. Brake mechanism of the class described comprising a rotary part, a drum connected with said rotary part, a stationary part, an annulus connected with the stationary part and located in the drum, said annulus having transverse openings therein, annular diaphragms at the sides of the annulus and having their inner and outer edges connected with the annulus, friction plates contacting the outer faces of the diaphragms, anchor bolts having their heads slidably arranged in the openings of the annulus and the shanks passing through threaded holes in friction plates and through holes in the diaphragms for clamping the friction plates to said diaphragms, friction means carried by the inner faces of the drum and engaged by the friction plates of the diaphragms when the diaphragms are expanded, and means for exerting separative force against said diaphragms and the annulus to expand the diaphragms.

DAVID FOWLER IRBY.